May 4, 1926.  1,583,076

F. A. LITTER

APPARATUS FOR HEATING COOKING ELEMENTS

Filed March 19, 1924

FREDERICK A. LITTER, INVENTOR.

BY
Edwin P. Corter, ATTORNEY.

Patented May 4, 1926.

1,583,076

UNITED STATES PATENT OFFICE.

FREDERICK A. LITTER, OF COLUMBUS, OHIO.

APPARATUS FOR HEATING COOKING ELEMENTS.

Application filed March 19, 1924. Serial No. 700,240.

*To all whom it may concern:*

Be it known that I, FREDERICK A. LITTER, a citizen of the United States of America, residing at Columbus, in the county of Franklin and State of Ohio, have invented certain new and useful Improvements in Apparatus for Heating Cooking Elements, of which the following is a specification.

My invention relates to apparatus for heating cooking elements and has to do particularly with the provision of a novel type of heating or cooking element in combination with means for conducting and circulating the exhaust gases from an internal combustion engine.

In the past, in utilizing the exhaust gases of an internal combustion engine as the heating medium for a heating or cooking element it has been the practice to conduct the exhaust gases to the interior of a suitable receptacle to heat the walls of such receptacle and then utilize such heated wall or walls to in turn heat the heating or cooking element placed upon such wall or walls. Various means have been provided for absorbing or increasing the absorption of heat from the exhaust gases passing through such receptacle but the heat has, in this type of apparatus, been conducted or connected from the exhaust gases to the wall or walls of the receptacle and then the heated surface of the receptacle utilized to heat the wall of the cooking element in order to heat the contents of such cooking element. Furthermore, attempts have been made to utilize a portion of the exhaust gases to directly heat the cooking element, but these efforts have apparently failed for the reason that the exhaust gases are not deflected by or passed into contact with the cooking element but instead have merely utilized the exhaust gases for imparting heat to the fluid in contact with the cooking element.

My invention has to do primarily with the method of conducting or impinging the exhaust gases, from an internal combustion engine, directly upon a surface of the heating or cooking element and then deflecting or baffling the exhaust gases to absorb the maximum amount of heat directly from the exhaust gases and to evenly distribute such heat over the heating surface of the cooking element. This novel method of passing the exhaust gases directly into contact with the cooking element is accomplished by means of a very simple, substantial and compact structure which comprises a means for deflecting the normal path of the exhaust gases from the internal combustion engine, a novel means in combination with the exhaust manifold for conducting the exhaust gases away from the manifold and a cooking element designed to cooperate with said conducting means for forming a passageway for the exhaust gases and for determining the path of such gases in order to absorb the maximum amount of heat therefrom.

One of the objects of my invention is the provision of a novel heating receptacle through which the exhaust gases are conducted or circulated, one part of said heating receptacle being formed by a cooking element itself.

Another object of my invention is the provision of a novel exhaust manifold cooking element, one part of which is designed to be permanently connected with the exhaust manifold and the other part of which may be removably applicable to said permanently connected part. The result is that when not in use, the cooking element itself may be removed and when put in use the cooking element may be easily applied to form an exhaust receptacle, whereby the exhaust gases passing through such receptacle to the atmosphere will pass directly in contact with the bottom surface of the cooking element.

A further object of my invention has to do with the provision of a passageway for the exhaust gases in passing through the receptacle formed in part by the cooking element. In this instance the passageway is formed by projections on the cooking element co-operating with projections on the other part of the receptacle for forming the passageway for the exhaust gases. The result is that when the cooking element is attached to the permanent element to form a receptacle the exhaust gases will not only pass in direct contact with the cooking element but will be deflected and baffled in their passage whereby the maximum amount of heat will be absorbed from the exhaust gases and the cooking element will be heated evenly and to the maximum possible temperature in accordance with the temperature of the exhaust gases.

Another object of my invention is the provision of means for centering the cooking element when placed upon the permanent half of the exhaust gas receptacle whereby the parts of each half co-operating to form the exhaust gas passageway will always be properly positioned to provide passageways of a constant dimension.

Another object of my invention consists in the provision of means for collecting the exhaust gases after they have passed in contact with the cooking element and exhausting such gases to the atmosphere by deflecting them upwardly and away from the outside portion of the cooking element.

Various other features of my invention will be apparent as this description progresses, and will be brought out in the claims appended hereto. The various objects of my invention are preferably obtained by the structure illustrated in the drawings wherein similar characters of reference designate corresponding parts and wherein:

Figure 1:
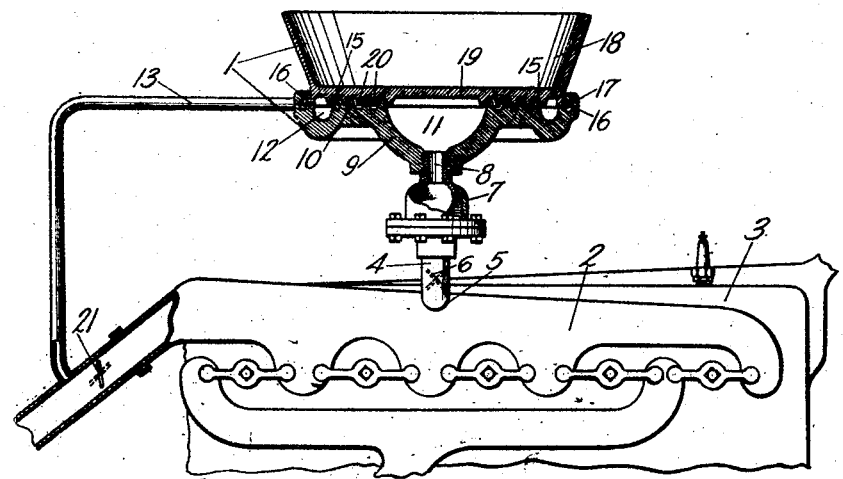
Figure 1 is a side elevation, partly in section, of my novel exhaust gas cooking element and showing the manner of connecting this device to the exhaust manifold of an internal combustion engine.

In the drawing and with particular reference to Figure 1 my cooking unit structure, which may be generally designated 1, is shown connected to the exhaust manifold 2 of an internal combustion engine 3. It will be understood that the exhaust manifold 2 and internal combustion engine 3 are merely conventionally shown and that any type of internal combustion engine and exhaust manifold may be used in combination with my novel cooking unit structure.

A suitable conduit or pipe 4 is connected to the exhaust manifold at a point 5. This pipe 4 is provided with a suitable butterfly valve 6 whereby the exhaust gases from the internal combustion engine may be shut off or allowed to pass through the pipe 4 as desired. The pipe 4 is preferably provided with a standard flexible ball joint or a suitable universal flexible pipe joint 7, the flexible ball or pipe 8 of such joint, as diagrammatically illustrated in Figure 1 being suitably threaded for the reception of an element 9 which may be termed the permanent lower half of my cooking unit. Thus, it will be obvious that the element 9, by reason of the flexible joint 7 may be adjusted to substantially any angle relative to the supporting pipe 4.

Figure 2:
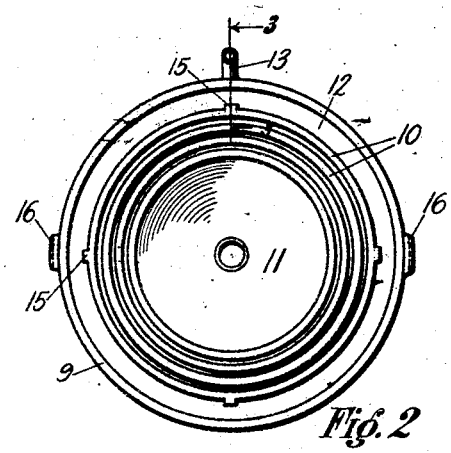
Figure 2 is a plan view of the lower half of the receptacle forming a part of the cooking unit and showing the annular corrugations of the cooking element to form a passageway for the exhaust gases.
Figure 3:
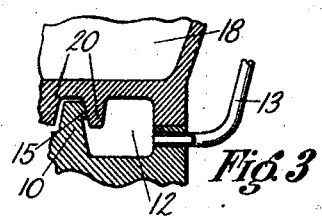
Figure 3 is a detail sectional view taken on line 3—3 of Figure 3 and showing the manner of conducting the exhaust gases to the atmosphere after the heat has been absorbed therefrom by the cooking element.

This permanent element 9 is preferably of circular shape in horizontal cross section and as best shown in Figures 1 and 2, is provided with a series of annular corrugations 10. The inner or smallest annular corrugation 10 forms part of the wall of a semispherical opening 11. The channel formed by the two outer annular corrugations 10 is a relatively larger channel than the channels formed by the other corrugations and this relatively large channel may be designated 12. As best shown in Figure 3, the channel 12 is provided with an exhaust outlet which comprises an upturned pipe 13. This upturned pipe 13 may be positioned as in Figure 3 to deflect the exhaust gases away from the person operating the cooking unit or such exhaust outlet 13 may, as shown in Figure 1, be connected to the outer end of the exhaust manifold. It will be understood that any number of these outlets 13 may be connected with the annular channel 12 or that such single outlet as may be used may be of any desired shape. The annular corrugation 10, which forms the inner part of the channel 12, is provided with a plurality of machined centering pins 15 whereby any other corrugation that may be placed adjacent this outer annular corrugation 10 will be positively centered with respect thereto.

The outer surface of the permanent element 9 is provided with two or more locking brackets 16. Designed to engage with said locking brackets 16 are the tapered lugs 17 which preferably form an integral part of a cooking element 18. These upwardly extending elements 16 are thus designed to pass around the locking lugs 17 and contact with the tapered upper edge of such locking lugs 17. The cooking element 18, which forms a part of the general cooking unit structure or exhaust gas receptacle 1, is provided with a base which is of circular cross sectional shape. The base of this cooking element 18 may be designated 19 and as such consists of a series of annular corrugations 20 which extend downwardly, as best shown in Figure 1.

The outer annular corrugation 20 of the base 19 is designed to contact with and rest upon the outer annular corrugation of the lower element 9, as is best shown in Figure 3. The other annular corrugations 20 are designed to inter-fit with and extend around or down in between the annular corrugations 10 of the element 9 whenever the cooking element 18 is placed upon the permanent lower element 9.

The centering lugs 15 of the lower element 9 will center the annular corrugations 20 of the cooking element 18 so that when the element 18 is placed upon the element 9 and turned about a vertical axis so that the locking elements 16 will embrace and be locked by the tapered locking lugs 17, the respective corrugations of the two elements 9 and 18 will always be positively positioned relative to each other. As best shown in Figure 1, the inter-fitting corrugations of the respective halves 9 and 19 of the cooking unit are positioned relative to each other so as to form a passageway for the exhaust gases radially in all directions from the semi-spherical center 11. As will be obvious from Figure 1 the exhaust gases in passing from the center 11 radially towards the annular channel 12 will be deflected and baffled by the annular corrugations 10 and 20. In order to ensure a positive circulation of the exhaust gases through the pipe 4, center 11 and through the passageways formed by the annular corrugations, I have provided a suitable butterfly valve 21 which, as shown in Figure 1, may be positioned at any suitable place in the exhaust manifold whereby its operation will regulate the exhaust gases so that all or any part of the volume of exhaust gases may be caused to pass through the cooking unit structure 1.

In the normal operation of this device the cooking element 18 may be placed upon the lower element 9 and turned about its vertical axis so as to be locked relative to such lower element 9 by means of the locking lugs 16. The butterfly valve 6 may then be opened and the valve 21 closed whereby all the exhaust gases from the motor will be deflected through the pipe 4. These exhaust gases passing through pipe 4 will enter the semi-spherical receptacle 11 and pass upwardly against the bottom portion of the cooking element 18. As the outlet 13 may be more or less restricted it will be obvious that such semi-spherical opening 11 will always contain a large volume of hot gases directly from the cylinders and that such gases will be substantially constant both in volume and temperature regardless of the time of explosion of the gases in the cylinders. The gases in passing through this inner receptacle 11 will impinge against the bottom 19 of the cooking element and will be deflected outwardly. These outwardly deflected gases will pass in and around the corrugated baffle elements 10 and 20, in a general radial direction, so as to thoroughly and equally heat all of such corrugations. The center of the base 19 is directly heated by the direct contact of the hot exhaust gases while the outer portion of this base 19 is heated to approximately the same temperature both by the heat from the baffled exhaust gases and by the heat which is absorbed and retained by the baffle elements or corrugations 20.

Figure 4:
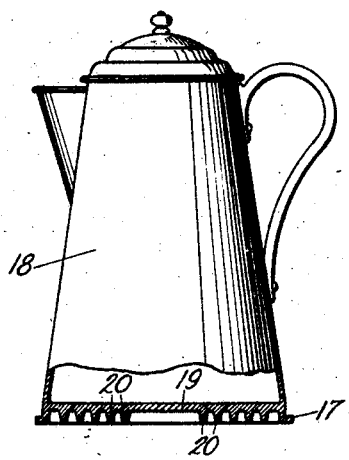
Figure 4 is a side elevation, partly in section, and showing a modified form of cooking element and showing the manner of constructing the bottom of such modified cooking element so as to co-operate with the general cooking unit.

It will be understood that the cooking element 18, which forms the upper half of the general cooking unit structure 1, may be interchangeable. In Figure 4, I have shown another cooking element which consists of a coffee pot provided with a base identical with the base of the cooking element shown in Figure 1.

It will be understood that the interchangeable cooking element 18 may be provided with suitable drain cocks or other means whereby the contents, such as boiling or sterilizing water, may be drained therefrom without removing the cooking element. It will be also understood that other designs and arrangements of baffle plates may be utilized to deflect the exhaust gases and absorb the heat therefrom and that any number of baffles or annular corrugations may be utilized in accordance with the size of cooking element being used and the evenness of the heat desired. It will further be understood that a plurality of these cooking unit structures may be utilized with a single internal combustion engine.

It will be apparent that I have provided an extremely simple and compact exhaust gas cooking unit which is so arranged in combination with the means for deflecting the path of the exhaust gases that such exhaust gases will be directed directly against the bottom surface of the cooking element itself whereby all of the heat from the exhaust gases will be directly utilized in cooking or heating the contents of the cooking element.

It will also be obvious that my novel cooking unit structure which consists of a permanent half and cooking element half is so arranged that it may be easily removable and interchangeable to accommodate various cooking elements and that the bases of such cooking elements are so arranged that the exhaust gases will be tortuously deflected and the heat absorbed therefrom evenly distributed over the bottom surface of such cooking element.

It will further be obvious that although I have shown and described my novel cooking unit in combination with an internal combustion engine of an automobile it will be understood that my cooking element may be untilized in combination with any internal combustion or other engine so long as a heated fluid may be passed through the cooking unit to serve as the heating means.

It will also be noted that by placing a suitable flexible joint between the exhaust gas pipe 4 and the element 9 that I have provided means whereby, regardless of the position of the automobile, the element 9 and obviously the cooking element 19 may be adjusted so that it will be level and suitable for cooking purposes. Thus, the automobile may be positioned upon any uneven surface as, for instance, a hillside and the cooking element adjusted to a level independently of the position of the internal combustion engine 3. It will be understood that such standard flexible joint may be arranged to position the cooking element at any adjusted position by tension or by suitable clamping means, as desired.

Having thus described my invention what I claim is:

1. In combination with an internal combustion engine, an element provided with annular corrugations, means for conducting exhaust gases from said engine to the center of said element and a cooking utensil provided with annular corrugations and adapted to cooperate with the corrugations of said element for forming a radial passageway for the gases.

2. In combination with an engine, a cooking utensil, means for conducting the exhaust gases from said engine into direct impinging contact with the bottom of said utensil and means permitting adjusting of the level of said cooking utensil.

3. In combination with an internal combustion engine, an element provided with annular corrugations, means for conducting exhaust gases from said engine to the center of said element, and a cooking utensil provided with annular corrugations and adapted to cooperate with the corrugations of said element for confining and extracting the heat from the exhaust gases and for exhausting the gases through a single port.

4. The combination with an internal combustion engine, an element provided with corrugations, means for conducting exhaust gases from said engine to the center of said element, and a cooking utensil provided with a corrugated bottom, said cooking utensil being adapted to co-operate with said element to form a passageway for conducting the exhaust gases in a thin tortuous sheet radially from the center of the cooking utensil.

5. The combination with an internal combustion engine, of an element provided with baffles, means for conducting exhaust gases from said engine to the said element, and a cooking utensil adapted to cooperate with said element, said cooking utensil being provided with baffles adapted to cooperate with and interfit with the baffles of said element for forming passageways for conducting the exhaust gases from the center outwards.

6. The combination with an internal combustion engine, a cooking utensil, means for conducting the exhaust gases from said engine into direct impinging contact with the bottom of said utensil, means for causing the gases to pass from the center outwards as a thin tortuous sheet in direct contact with the bottom of said utensil, and means permitting adjusting of the level of said cooking utensil.

7. The combination with an internal combustion engine of an open vessel, means for conducting exhaust gases from said engine to the open vessel, a cooking utensil having a bottom portion adapted to co-operate with said open vessel, said open vessel and said cooking utensil bottom being provided with inter-fitting baffles for causing said gases to pass as a thin tortuous sheet from the center outwards in direct contact with the bottom of said utensil.

8. A cooking device for operation in connection with internal combustion engines comprising an element provided with corrugations, a connection between said element and the exhaust manifold of said engine for conducting the exhaust gases to said element, and a cooking utensil having a corrugated bottom adapted to co-operate with said element and the corrugations thereon for forming a tortuous passageway for conducting the exhaust gases in a thin sheet from the center outwards.

In testimony whereof I hereby affix my signature.

FREDERICK A. LITTER.